US00RE42303E

(19) United States
(12) Reissued Patent
Norin et al.

(10) Patent Number: US RE42,303 E
(45) Date of Reissued Patent: Apr. 26, 2011

(54) FEMALE ELECTRICAL CONNECTOR COMPONENT

(75) Inventors: Joakim Norin, Stockholm (SE); Tor Magnusson, Stockholm (SE)

(73) Assignee: CTEK Sweden AB, Vikmanshyttan (SE)

() Term: 14 Years**

(21) Appl. No.: 29/353,939

(22) Filed: Jan. 15, 2010

Related U.S. Patent Documents

Reissue of:
(64) Patent No.: Des. 596,126
Issued: Jul. 14, 2009
Appl. No.: 29/317,233
Filed: Apr. 24, 2008

(30) Foreign Application Priority Data

Nov. 30, 2007 (EM) ..... 000835541-0001
Nov. 30, 2007 (EM) ..... 000835541-0002

(51) LOC (9) Cl. ..... 13-03
(52) U.S. Cl. ..... D13/133
(58) Field of Classification Search ..... D13/101, D13/107, 108, 110, 114, 118, 133, 146, 147, D13/153, 154, 199; 320/110–115; 362/427, 362/404, 406, 804, 287; 363/146; 336/92; 439/489, 502, 505, 578, 607–610, 623, 680, 439/686

See application file for complete search history.

(56) References Cited

U.S. PATENT DOCUMENTS

| | | | | | |
|---|---|---|---|---|---|
| D321,503 | S | * | 11/1991 | Ditzig | D13/133 |
| D454,542 | S | * | 3/2002 | Nakashima et al. | D13/146 |
| D487,147 | S | * | 2/2004 | Ellingboe et al. | D24/129 |
| D503,925 | S | * | 4/2005 | Wu | D13/133 |
| 6,981,888 | B2 | * | 1/2006 | O'Keefe et al. | 439/369 |
| D516,032 | S | * | 2/2006 | Suckle et al. | D13/147 |
| D520,459 | S | * | 5/2006 | Kent et al. | D13/156 |
| D555,094 | S | * | 11/2007 | Victor | D13/133 |
| 7,452,233 | B1 | * | 11/2008 | Michelsen | 439/369 |
| D586,750 | S | * | 2/2009 | Li | D13/133 |
| 2006/0148287 | A1 | * | 7/2006 | Zahnen et al. | 439/135 |

* cited by examiner

*Primary Examiner* — Thomas J Johannes
(74) *Attorney, Agent, or Firm* — Foley & Lardner LLP

(57) CLAIM

We claim the ornamental design for female electrical connector component, as shown and described.

DESCRIPTION

Figure 1:
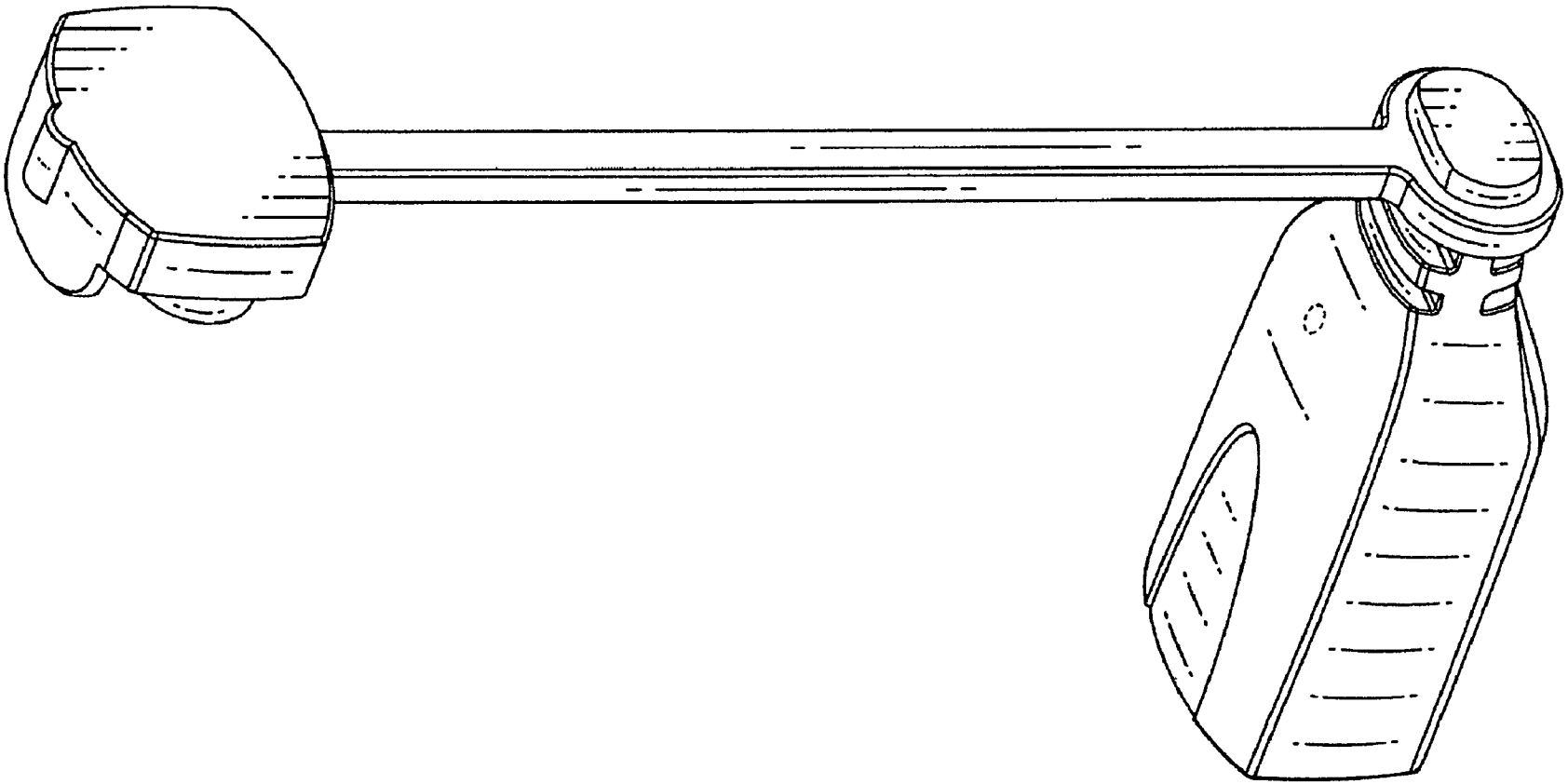
Figure 2:
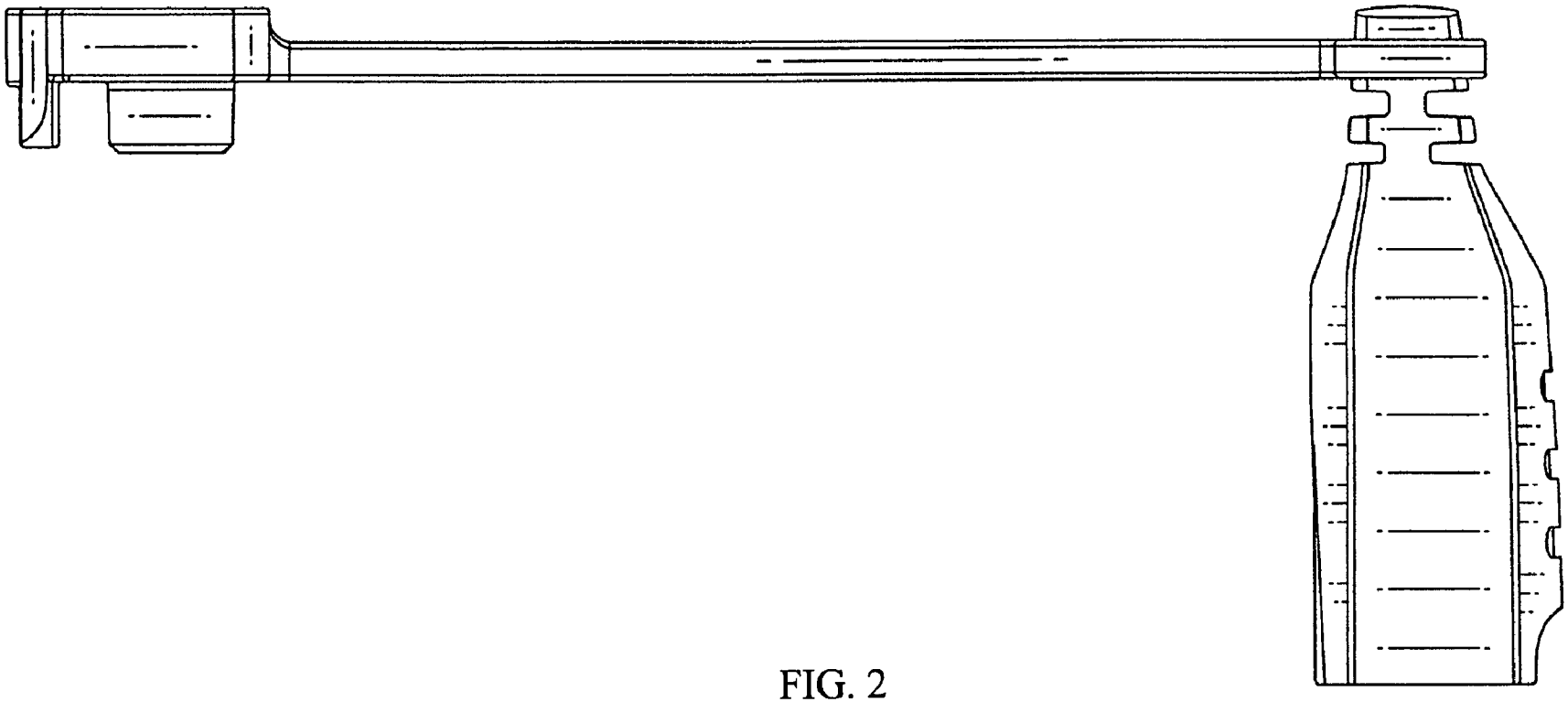
Figure 3:
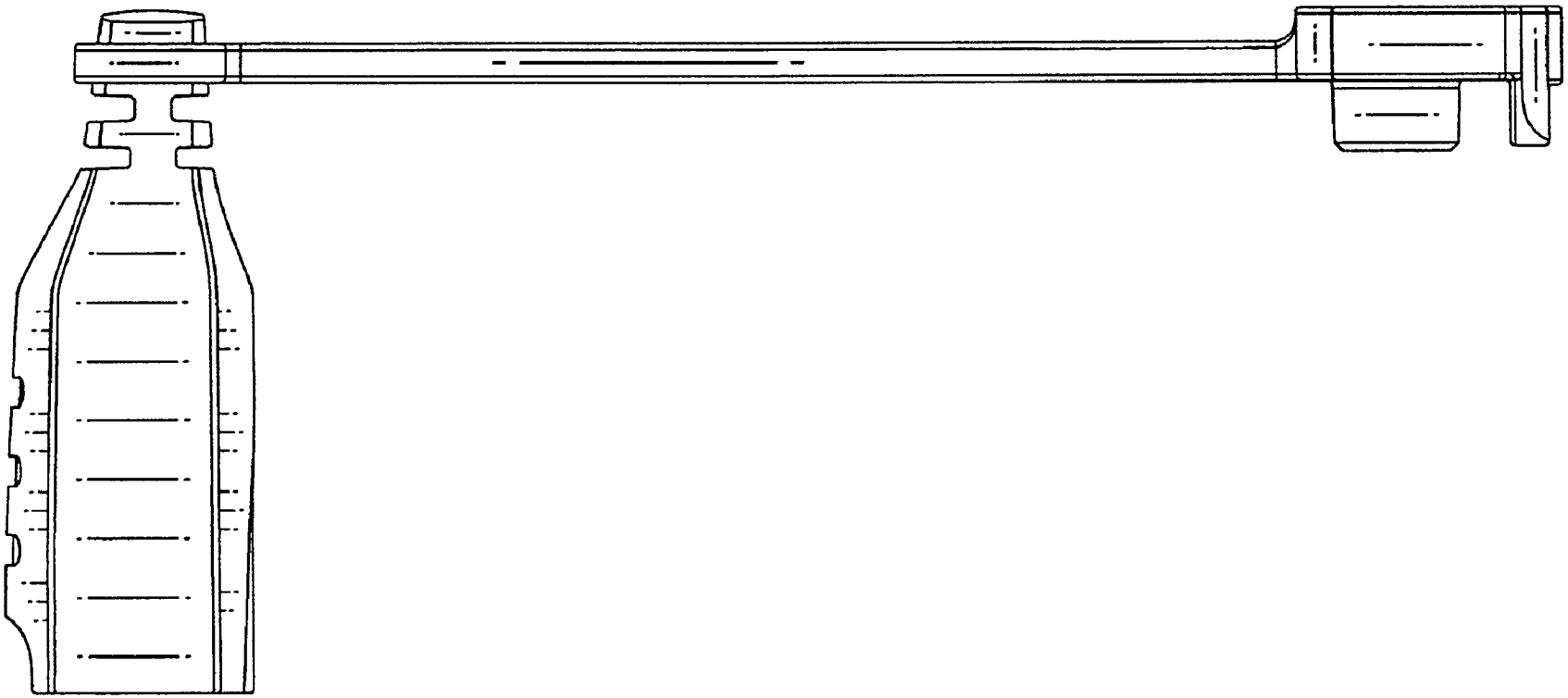
Figure 4:
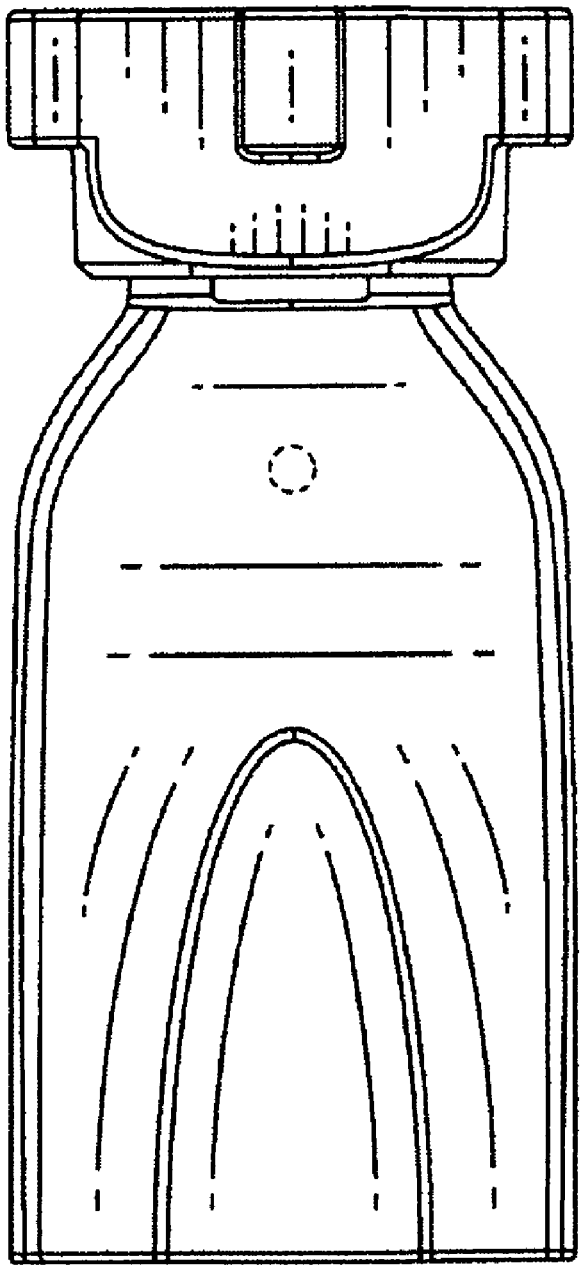
Figure 5:
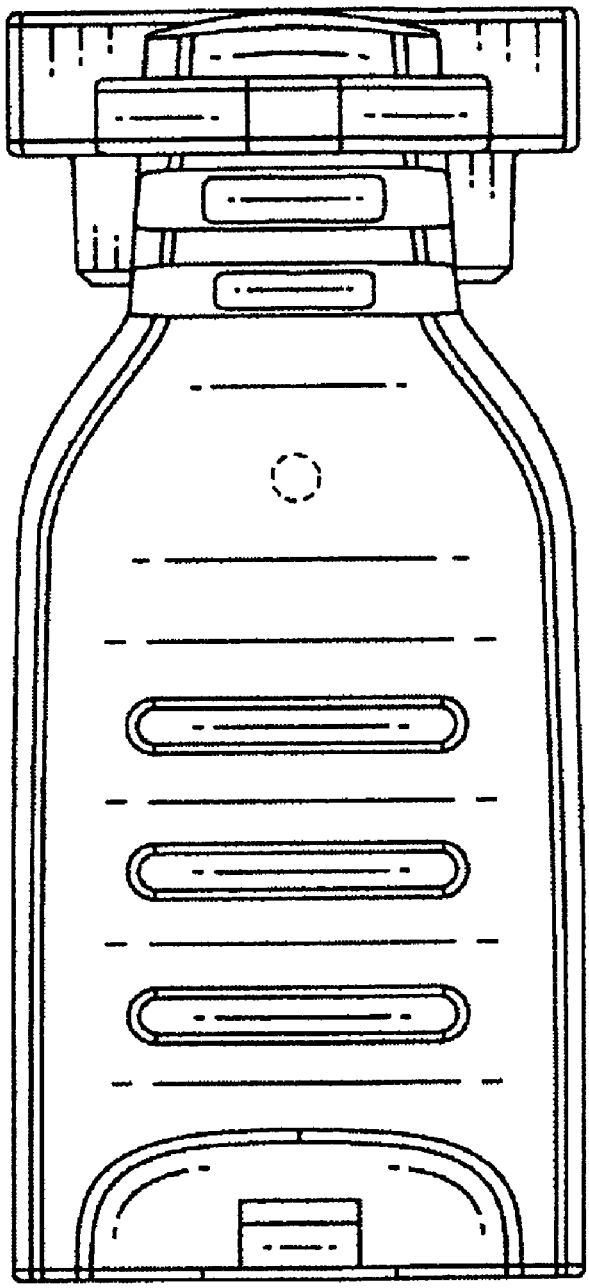
Figure 6:
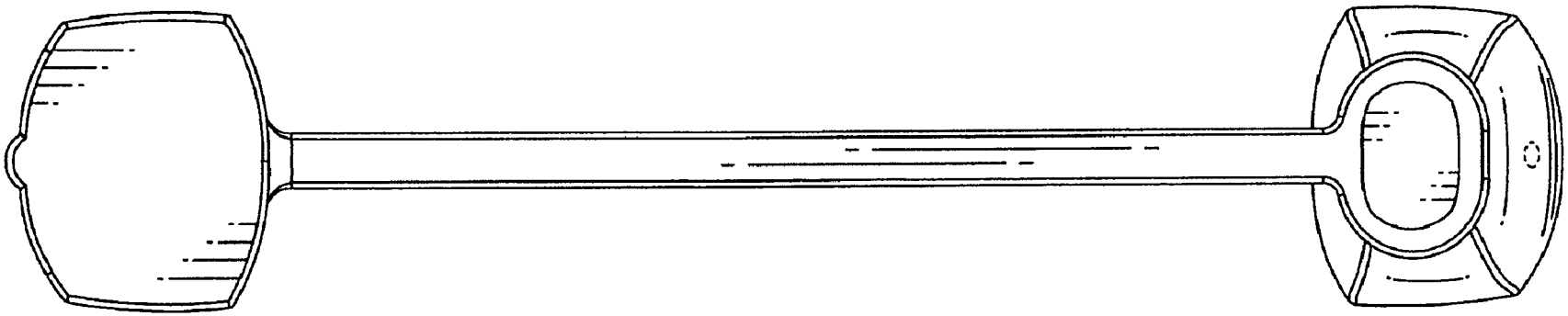
Figure 7:
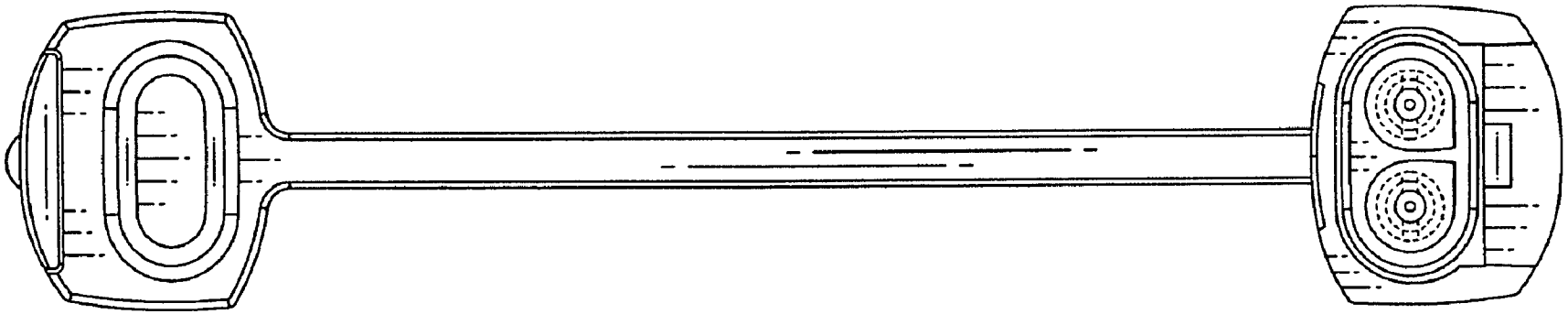
Figure 8:
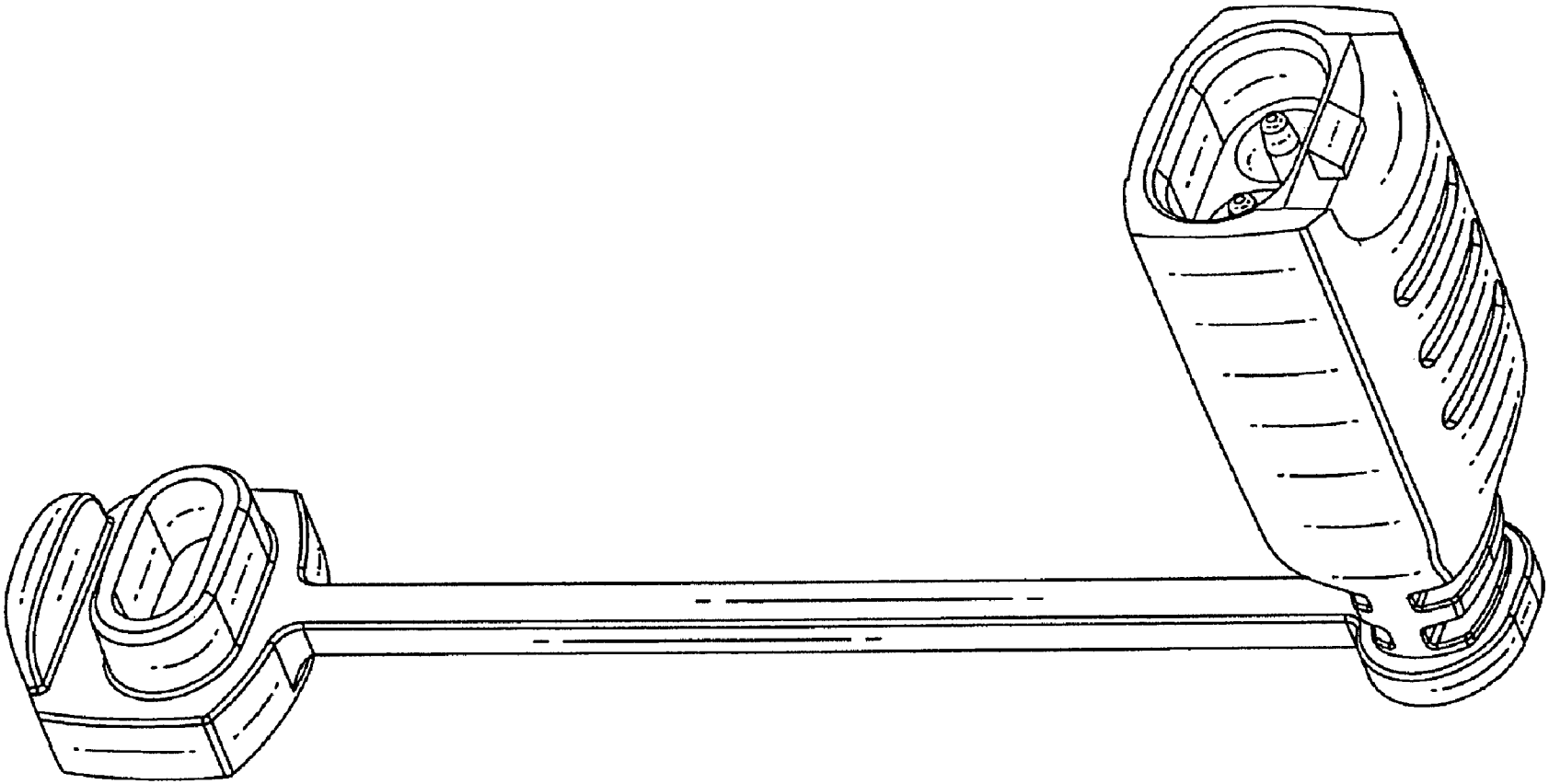

FIG. 1 is a top, front, right-side perspective view of a female electrical connector component showing our new design;
FIG. 2 is a right side view of a thereof;
FIG. 3 is a left side view of a thereof;
FIG. 4 is a front view of a thereof;
FIG. 5 is a rear view of a thereof;
FIG. 6 is a top view of a thereof;
FIG. 7 is a bottom view of a thereof; and,
FIG. 8 is a bottom, rear, left side perspective view of a thereof.
The broken line portion of the figure drawings is included to show unclaimed subject matter only and forms no part of the claimed design.

1 Claim, 8 Drawing Sheets

Matter enclosed in heavy brackets [ ] appears in the original patent, but forms no part of this reissue; matter printed in italics indicates the additions made by reissue.